United States Patent
Amonett

(10) Patent No.: US 9,601,967 B2
(45) Date of Patent: Mar. 21, 2017

(54) ELECTRIC MOTOR BRUSH APPARATUS AND METHOD

(71) Applicant: The Scott Fetzer Company, Westlake, OH (US)

(72) Inventor: Daniel K. Amonett, Murfreesboro, TN (US)

(73) Assignee: The Scott Fetzer Company, Westlake, OH (US)

(*) Notice: Subject to any disclaimer, the term of this patent is extended or adjusted under 35 U.S.C. 154(b) by 505 days.

(21) Appl. No.: 14/325,602

(22) Filed: Jul. 8, 2014

(65) Prior Publication Data

US 2015/0318652 A1 Nov. 5, 2015

Related U.S. Application Data

(60) Provisional application No. 61/987,831, filed on May 2, 2014.

(51) Int. Cl.
| | |
|---|---|
| *H01R 39/40* | (2006.01) |
| *H02K 5/22* | (2006.01) |
| *H02K 13/00* | (2006.01) |
| *H01R 39/38* | (2006.01) |
| *H01R 39/04* | (2006.01) |
| *H02K 5/14* | (2006.01) |
| *H02K 23/08* | (2006.01) |

(52) U.S. Cl.
CPC ............. *H02K 5/225* (2013.01); *H01R 39/04* (2013.01); *H01R 39/381* (2013.01); *H01R 39/40* (2013.01); *H02K 5/148* (2013.01); *H02K 13/00* (2013.01); *H02K 13/006* (2013.01); *H02K 23/08* (2013.01); *Y10T 29/49011* (2015.01)

(58) Field of Classification Search
CPC ...... H01R 39/04; H01R 39/40; H01R 39/381; H02K 13/006; H02K 5/225; H02K 13/00; H02K 5/148
USPC .................................. 310/219-253
See application file for complete search history.

(56) References Cited

U.S. PATENT DOCUMENTS

| | | |
|---|---|---|
| 3,177,388 A | 4/1965 | Cook |
| 4,059,776 A | 11/1977 | Schreiber et al. |
| 4,163,167 A | 7/1979 | Zelt et al. |

(Continued)

FOREIGN PATENT DOCUMENTS

| | | |
|---|---|---|
| DE | 102006053791 A1 | 5/2008 |
| EP | 0940906 A2 | 9/1999 |
| JP | 2004-289934 A1 | 10/2004 |

*Primary Examiner* — Naishadh Desai
(74) *Attorney, Agent, or Firm* — Emerson Thomson Bennett, LLC; Roger D. Emerson; Sergey Vernyuk

(57) ABSTRACT

A motor assembly includes: a motor housing including: at least one brush receptacle having top and bottom ends; a locking element extending from the top end toward the bottom end; and a housing spring member; at least one brush holder apparatus including: a brush holder housing sized to be received within the brush receptacle, including: an upper surface and a lower surface; a receiving aperture; and an open end; a brush spring enclosed by the brush holder housing; and a brush located inside the brush holder housing; wherein the brush holder apparatus is inserted inside the brush receptacle; and wherein the housing spring member urges the brush holder apparatus toward the top end such that the locking element is received inside the receiving aperture.

20 Claims, 9 Drawing Sheets

(56) References Cited

U.S. PATENT DOCUMENTS

| | | | |
|---|---|---|---|
| 4,250,613 A * | 2/1981 | Sauerwein | H01R 39/41 |
| | | | 29/597 |
| 4,329,612 A * | 5/1982 | Averill | H01R 39/40 |
| | | | 310/239 |
| 4,746,828 A | 5/1988 | Nado et al. | |
| 4,883,998 A | 11/1989 | Lau | |
| 4,963,779 A | 10/1990 | Lentino | |
| 5,159,222 A | 10/1992 | Southall | |
| 5,465,016 A | 11/1995 | Mancl et al. | |
| 5,878,480 A | 3/1999 | Rawls | |
| 7,038,344 B2 | 5/2006 | Winkler et al. | |
| 7,518,274 B1 | 4/2009 | Mancl et al. | |
| 7,671,505 B2 | 3/2010 | Yamamoto et al. | |
| 2008/0318724 A1 | 12/2008 | Lott et al. | |
| 2010/0207483 A1* | 8/2010 | Buttner | H01R 39/41 |
| | | | 310/242 |

* cited by examiner

ELECTRIC MOTOR BRUSH APPARATUS AND METHOD

I. BACKGROUND

This invention pertains to the art of installing motor brush holders inside a motor. It is known in the art to secure a brush housing apparatus to an electric motor housing by using an interference fit between the outside surface of the brush housing and a receiving surface on the motor housing. The brush housing may be further secured by applying adhesive to the assembled parts. This method of attachment may be expensive as the interference fit requires exacting tolerances to both mating parts. These tolerances can add cost to the assembly. Also the choice of adhesive may be difficult as the brush operates in a high temperature and high vibration environment.

It is also known in the art to use straps and fasteners to secure the brush to the motor housing. This method adds additional parts and additional assembly time to the motor. Another known securing method is to add tabs to the outside of the brush apparatus and locate the brush in a receptacle formed in the motor housing. The brush is then secured in the housing by bending the tabs over the receptacle. Bending the tabs according to this method adds assembly time and thus cost.

One known method to electrically connect the brush apparatus to the motor field is to extend a conductive wire from the brush and electrically connect the wire to a wire extending from the motor field. This method adds additional assemble steps and time to the electric motor assembly.

What is needed is a durable, efficient, simplified, and cost-effective method and apparatus to electrically connect and secure brush apparatuses and field windings of electric motors without using adhesives, fasteners, or wire splices.

II. SUMMARY

In accordance with one aspect of the present invention, a motor assembly includes: a motor housing including: at least one brush receptacle extending along a longitudinal axis of the brush receptacle and having a top end and a bottom end that are substantially parallel to the longitudinal axis; a locking element extending from the top end toward the bottom end of each brush receptacle; and a cantilevered housing spring member having a distal end extending substantially along the longitudinal axis and extending from the bottom end toward the top end of each brush receptacle; at least one brush holder apparatus including: a brush holder housing sized to be received within the at least one brush receptacle, including: an upper surface and a lower surface that are substantially parallel; a first receiving aperture in the upper surface configured to receive the locking element when the brush holder housing is inserted inside the at least one brush receptacle; and an open end that is substantially perpendicular to the upper surface; a brush spring enclosed by the brush holder housing; and a brush located inside the brush holder housing but urged out of the open end of the brush holder housing by the brush spring along the longitudinal axis when the brush holder housing is inserted inside the at least one brush receptacle; wherein the at least one brush holder apparatus is inserted inside the at least one brush receptacle along the longitudinal axis; and wherein the housing spring member urges the at least one brush apparatus toward the top end of the at least one brush receptacle such that the locking element is received inside the first receiving aperture.

In accordance with another aspect of the present invention, a motor assembly includes: a field including: a laminated stator; at least one terminal block secured to the laminated stator and including a connector receptacle; field windings; and at least one wire electrically connected to the field windings and positioned partly in the connector receptacle; at least one conductive connector including: two substantially flat and parallel displacement members, each including: a top portion; and a distal portion including a cutting portion extending from the distal portion toward the top portion and configured to receive the wire; and two connector spring members, each including: a substantially flat lower portion adjacent to, connected to, and substantially perpendicular to at least one displacement member; and an upper portion extending above the top portions of the displacement members and cantilevered along substantially a connector axis of the connector; wherein the cutting portions of the displacement members align along the connector axis, and wherein the displacement members are substantially perpendicular to the connector axis; wherein the top portions of the displacement members define a brush receiving plane; wherein the distal portions of the displacement members extend below the lower portions of the connector spring members; and wherein the upper portions of the connector spring members are angled toward each other at cantilevered ends, defining with the brush receiving plane a brush receiving channel along the connector axis, wherein the brush receiving channel narrows in the direction of the connector axis toward the cantilevered ends; and at least one brush holder apparatus including: a brush holder housing sized to be received within the brush receiving channel, comprising an open end; a brush spring enclosed by the brush holder housing; and a brush located inside the brush holder housing but urged out of the open end of the brush holder housing by the brush spring along the connector axis when the brush holder housing is inserted inside the brush receiving channel; wherein the at least one connector is inserted into the connector receptacle such that the cutting portions of the displacement members receive and make electrical connection with the at least one wire; and wherein the at least one brush holder apparatus is inserted inside the brush receiving channel of the at least one connector along the connector axis in the direction of narrowing of the brush receiving channel until the at least one brush holder apparatus is held securely by the at least one connector.

In accordance with still another aspect of the present invention, a method includes the steps of: a) providing: a motor housing including: at least one brush receptacle extending along a longitudinal axis of the brush receptacle and having a top end and a bottom end that are substantially parallel to the longitudinal axis; a locking element extending from the top end toward the bottom end of each brush receptacle; and a cantilevered housing spring member having a distal end extending substantially along the longitudinal axis and extending from the bottom end toward the top end of each brush receptacle; at least one brush holder apparatus including: a brush holder housing sized to be received within the at least one brush receptacle, including: an upper surface and a lower surface that are substantially parallel; a first receiving aperture in the upper surface configured to receive the locking element when the brush holder housing is inserted inside the at least one brush receptacle; and an open end that is substantially perpendicular to the upper surface; a brush spring enclosed by the brush holder housing; and a brush located inside the brush holder housing but urged out of the open end of the brush holder housing by the brush spring along the longitudinal axis when the brush holder housing is inserted inside the at least one brush receptacle; b) inserting the at least one brush holder apparatus, the open end first, into the at least one brush receptacle along the longitudinal axis, causing the housing spring member to move away from the top end of the brush receptacle; c) aligning the locking element with the first receiving aperture; and d) allowing the housing spring member to urge the brush holder apparatus toward the top end of the brush receptacle and causing the first receiving apparatus to receive the locking element.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
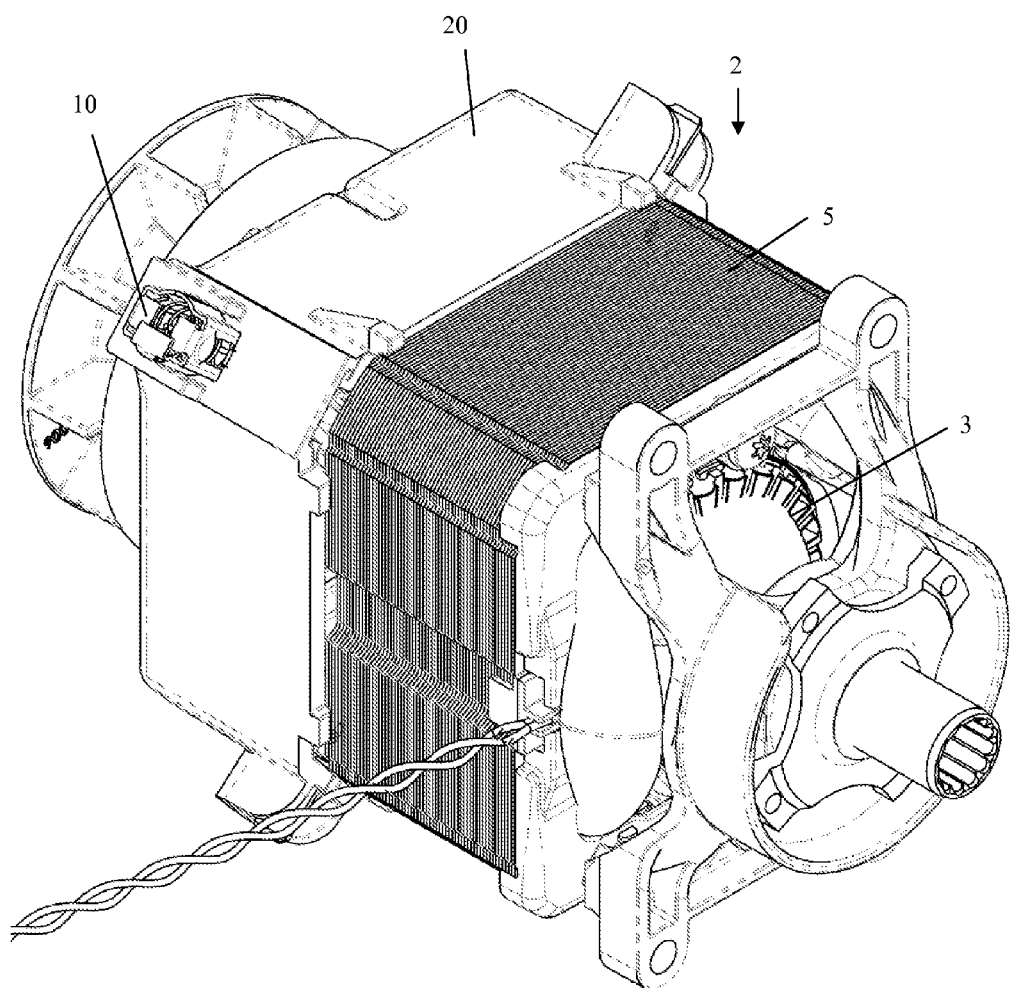
FIG. 1 is a perspective view of an assembled motor.

Referring now to the drawings wherein the showings are for purposes of illustrating embodiments of the invention only and not for purposes of limiting the same, and wherein like reference numerals are understood to refer to like components, FIG. 1 shows an assembled electric motor 2. The motor 2 may have a motor housing 20 that receives and secures at least one brush holder apparatus 10. In one embodiment, the motor housing 20 may be made from electrically insulating materials; a non-limiting example of such a material would be plastic or polymer. In another embodiment, the housing 20 may be made from a conductive material. Motors 2 may include any DC, AC, or universal motors that use brushes. Such motors may be used in applications that include, but are not limited to, blenders, vacuum cleaners, air compressors, and other devices.

Figure 2:
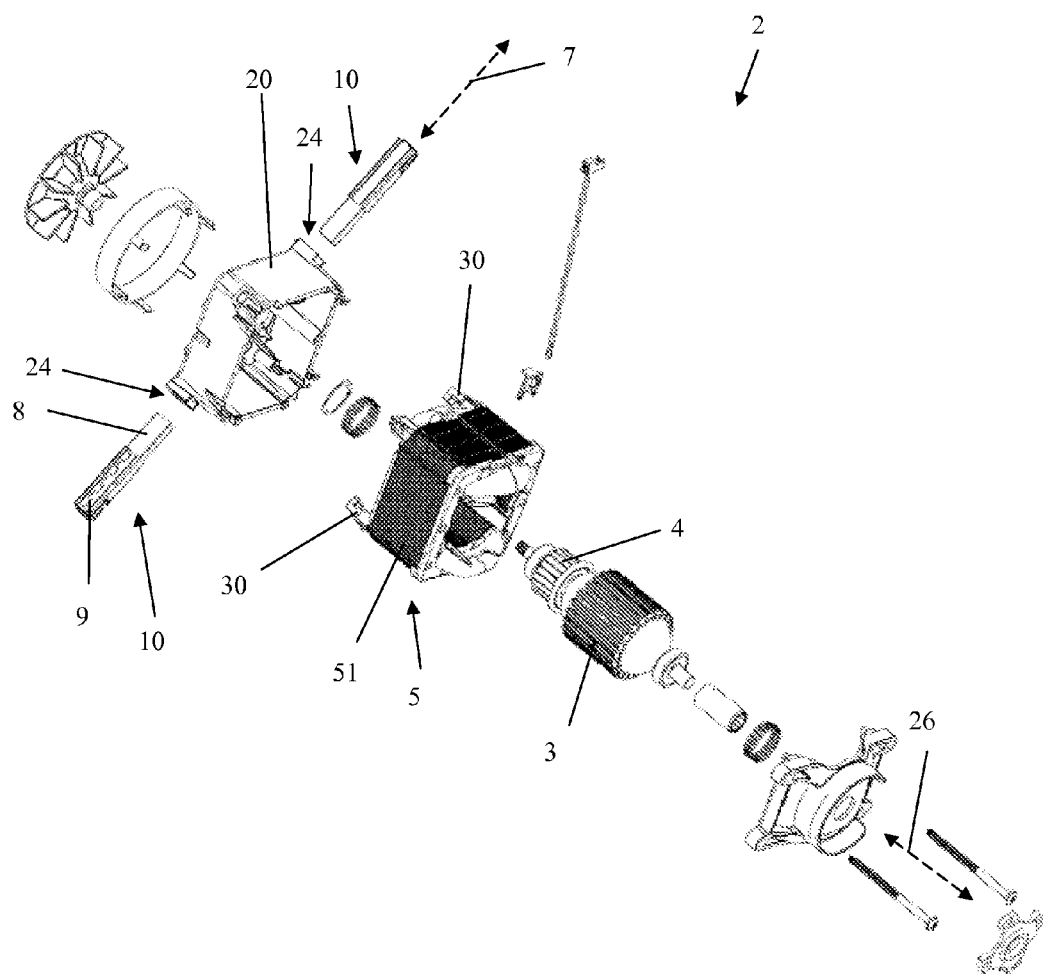
FIG. 2 is a perspective view of a disassembled motor.

FIG. 2 shows a perspective view of a disassembled motor 2. The motor may further include an armature 3, which has a commutator 4, and a field 5. The armature 3 may be inserted along a motor axis 26 (aligned with the motor shaft) inside the field 5 and both 3, 5 placed inside the motor housing 20 such that at least a portion of the field 5 is housed inside the housing 20, as shown in FIG. 1. If the motor housing 20 is made from a conductive material, insulation may isolate the housing 20 from the armature 3, the field 5, and the brush holder apparatus 10.

Figure 9:
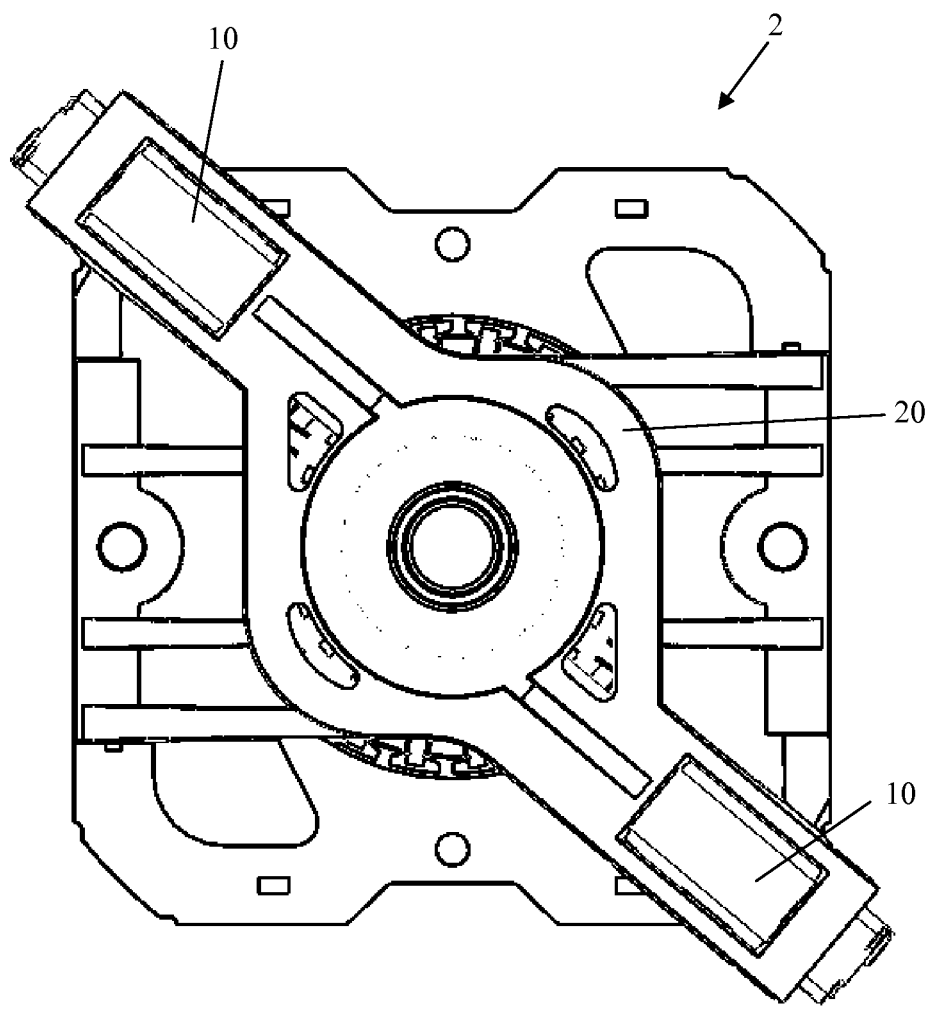
FIG. 9 is an end view of a motor.

With continued reference to FIG. 2, one embodiment of the motor 2 may include two brush holder apparatuses 10. In another embodiment, the two brush holder apparatuses 10 may be positioned within the motor housing 20 opposite each other, aligned along a common axis 7. In another embodiment, the two brush holder apparatuses 10 may be offset from a common axis 7 within the motor housing 20; FIG. 9 shows such an example. In another embodiment, the offset brush holder apparatuses 10 may be parallel to each other. In alternative embodiments, as many brush holder apparatuses 10 as needed may be used. In another embodiment, the brush holder apparatuses 10 may be positioned at corners of a substantially rectangular housing 20. The brush holder apparatus 10 may include a brush holder housing 9 and a brush 8. In one embodiment, the brush 8 may be made from carbon. In one embodiment, the brush holder housing 9 may be made from a conductive material, including, but not limited to, brass, copper, silver, gold, and aluminum. In alternative embodiments, the brush holder housing 9 may be made from a nonconductive material, including, but not limited to, polymer and rubber.

With continued reference to FIG. 2, the motor housing 20 may include at least one brush receptacle 24 sized to receive the at least one brush holder apparatus 10. In alternative embodiments, the housing 20 may include as many brush receptacles 24 as there are brush holder apparatuses 10. The brush holder apparatus 10 may be inserted into the brush receptacle 24 from outside the housing 20 inwards along the apparatus's (or the brush receptacle's 24) longitudinal axis 7 and perpendicular to the motor axis 26. The armature 3 and field 5 may be secured inside the housing 20 such that the field 5 encircles and matches the armature 3 and the brush holder apparatus 10, when installed inside the brush receptacle 24, is aligned such that the brush 8 contacts the commutator 4.

Figure 3:
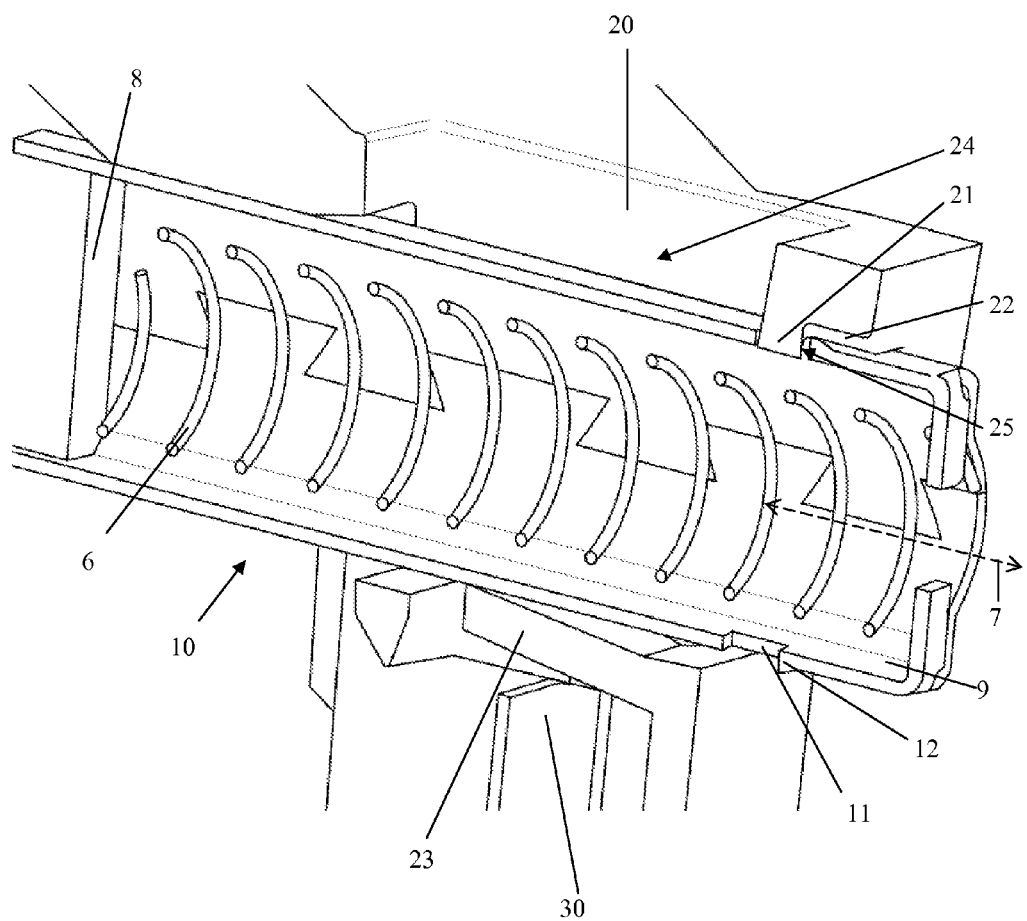
FIG. 3 is a cross-sectional perspective view of a brush holder apparatus installed in a motor housing.
Figure 6:
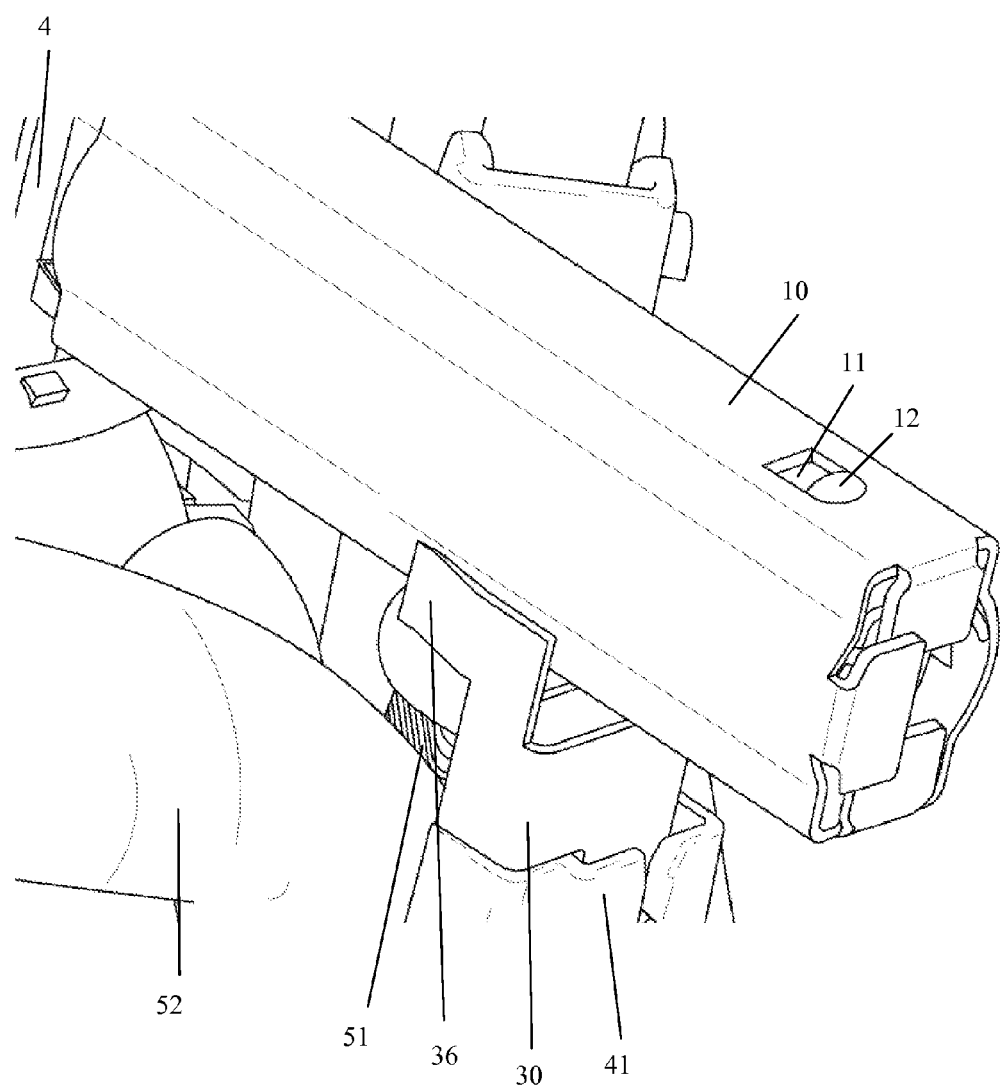
FIG. 6 is a perspective view of an insulation displacement connector contacting a brush holder apparatus.

FIG. 3 shows a partial cross-sectional view of a brush holder apparatus 10 installed in a brush receptacle 24 of the motor housing 20. While it is known in the art to secure a brush holder to a motor housing, what is not known is how to achieve a secure attachment by integrating the securing features into the housing 20 and the brush holder apparatus 10, thus eliminating fasteners, adhesives, and additional assembly steps. A brush holder apparatus 10 may take the form of a substantially four-sided brush holder housing 9 extended along a longitudinal axis 7 of the brush holder apparatus 10. In alternative embodiments, the brush holder housing 9 may be a rectangular prism, or may have some rounded sides, as shown in FIG. 6. A brush spring 6 may be secured inside the brush holder housing 9 to urge the brush 8 out of an open end of the brush holder housing 9 such that the brush 8 may contact the commutator 4 when the motor 2 is assembled. The brush holder apparatus 10 may have receiving apertures 11 formed on its upper and lower surfaces. These receiving apertures 11 may have locating elements 12 substantially adjacent to the location of the apertures 11. The locating elements 12 may extend above the upper and lower surfaces of the brush holder apparatus 10 away from the lower and upper surfaces, respectively. In another embodiment, the brush holder apparatus 10 may have only one receiving aperture 11 and locating element 12.

With continued reference to FIG. 3, extending down from the top interior surface or end of the brush receptacle 24 toward its bottom end may be a locking element 21. The description of a top or bottom end or surface is an arbitrary reference point, and such surfaces or ends may be oriented in any other direction or angle. The position, size, and shape of the locking element 21 may be such that when the brush holder apparatus 10 is put into the brush receptacle 24, the locking element 21 is received inside the receiving aperture 11. Formed into the brush receptacle 24 and located adjacent to the locking element 21 may be a recessed pocket 22. The recessed pocket 22 provides clearance for the locating element 12 so that the brush holder apparatus 10 may be inserted into the brush receptacle 24 without interference. A surface 25 common to the recessed pocket 22 and the locking element 21 may cooperate with the locating element 12 to locate the brush holder apparatus 10 along the longitudinal axis 7.

With continued reference to FIG. 3, also contained within the brush receptacle 24 may be a housing spring member 23 or spring. The housing spring member 23 may be located on an opposing surface or end of the brush receptacle 24 from the locking element 21. The housing spring member 23 may be a substantially cantilevered element. Also, the housing spring member 23 may have its distal end angled upwards so that when the bush holder apparatus 10 is inserted into the brush receptacle 24, the brush holder apparatus 10 forces the housing spring member 23 downwards. In this manner, the housing spring member 23 may apply an upward force to the brush holder apparatus 10 and assist in retaining the locking element 21 in the receiving aperture 11. In one embodiment, the housing spring member 23 may also be made from electrically insulating materials; a non-limiting example of such a material would be plastic.

Figure 4:
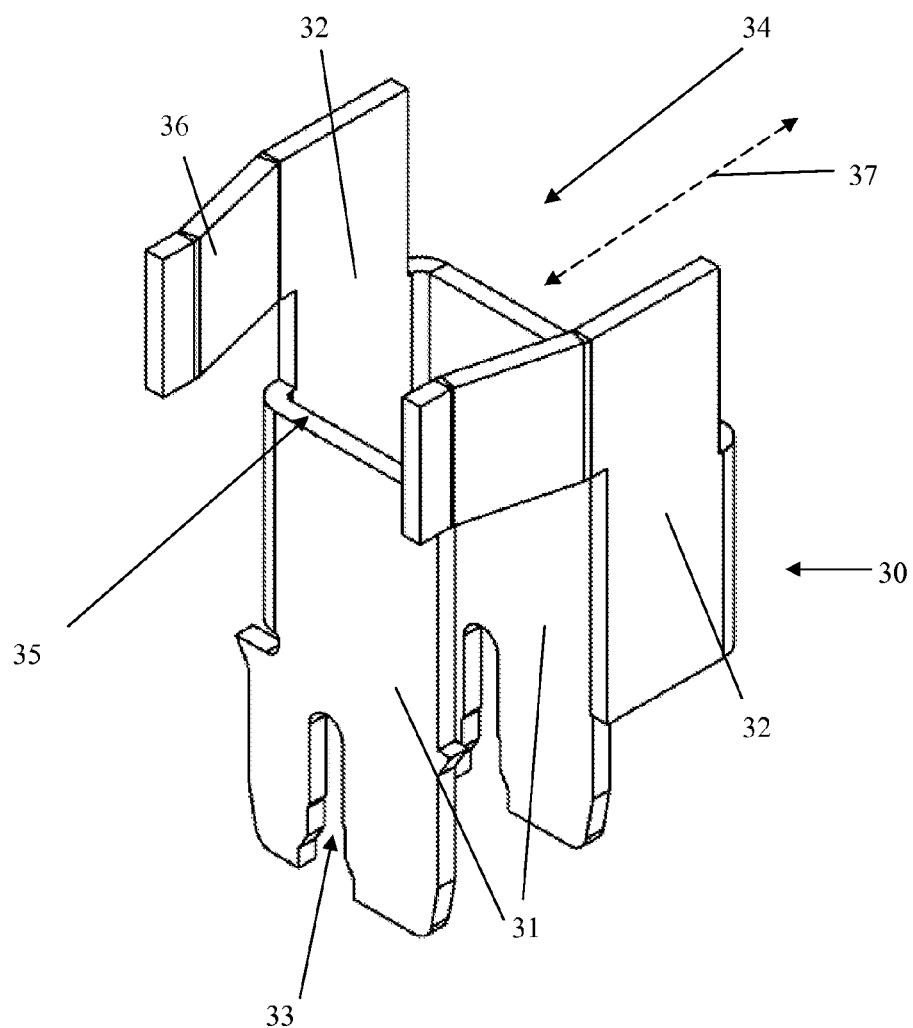
FIG. 4 is a perspective view of an insulation displacement connector.
Figure 7:
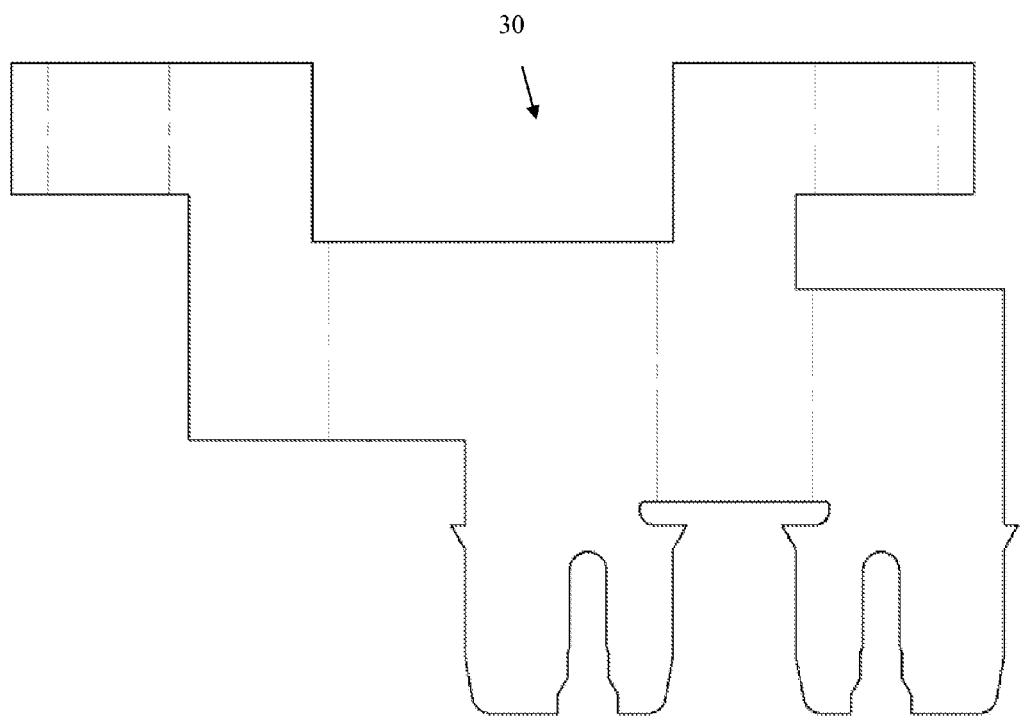
FIG. 7 is a view of a flat sheet cut out in the shape of an insulation displacement connector.
Figure 8:
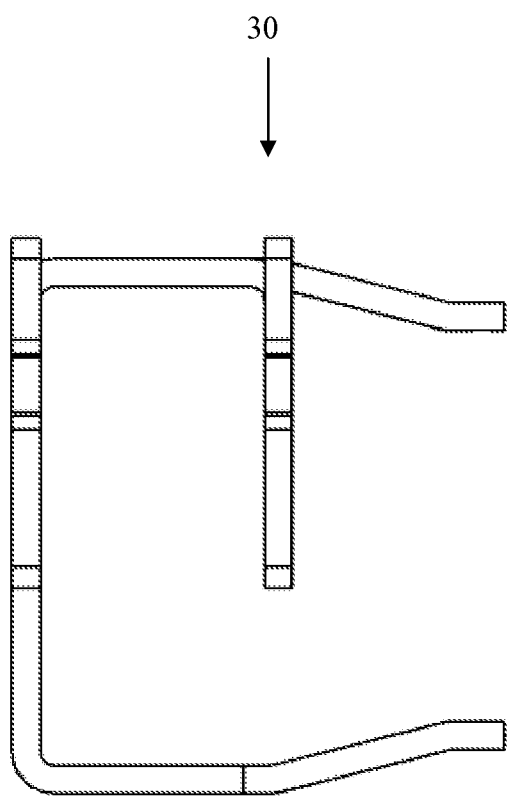
FIG. 8 is a bottom view of an insulation displacement connector.

FIG. 4 shows one embodiment of an insulation displacement connector (IDC) 30. FIG. 8 shows a bottom view of the same IDC 30. While it is known in the art to electrically connect a brush holder to an electric motor field, what is not known is how to achieve this connection by integrating the securing features and connection features into the electrical connection member and providing a robust electrical connection, reduced components, and reduced assembly time. The IDC 30 may be made from electrically conductive material; non-limiting examples of such a material are brass, copper, silver, gold, and aluminum. In one embodiment, an IDC 30 may be made from one, integral flat sheet or pattern using a metal forming process, as shown in FIG. 7.

Figure 5:
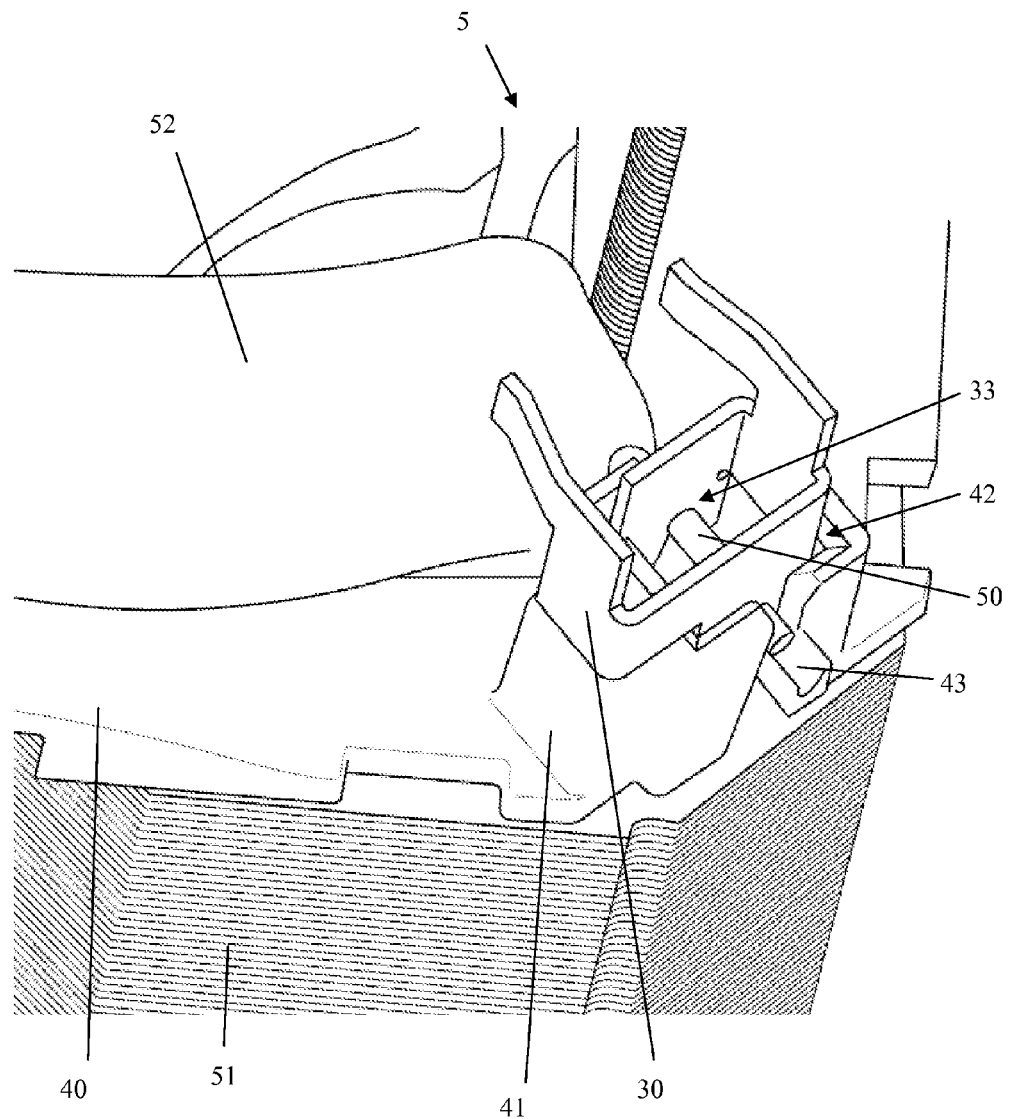
FIG. 5 is a perspective view of an insulation displacement connector installed in a terminal board.

With continued reference to FIG. 4, the IDC 30 may contain a plurality of displacement members 31 or plates. Each displacement member 31 may have a cutting portion 33 at its distal end. The cutting portion 33 may be shaped and sized to receive insulation coated electrical wire 50, as shown in FIG. 5. Also, the cutting portion 33 may be shaped and sized such that when force is applied to the displacement member 31 with wire 50 in place, the cutting portion 3 displaces the insulation from the wire 50 and an electrical connection is made between the wire 50 and the displacement member 31. The cutting portion 33 may also be shaped and sized such that the insulation may be displaced from the wire 50 without inducing significant damage to the wire 50. One non-limiting example of the shape of a cutting portion 33 is a V shape where the wire 50 would lie in the V. The cutting portion 33 may be smaller than the diameter of the insulation on the wire 50 and thus cut the insulation when forced against the wire 50.

With continued reference to FIG. 4, displacement members 31 may be located along and perpendicular to the longitudinal or connector axis 37 of the IDC 30. When arranged in this manner, the top surfaces of displacement members 31 form a brush receiving plane 35. Also, the displacement members 31 may lie substantially parallel to each other with their respective cutting portions 33 aligned on a common center line.

With continued reference to FIG. 4, a plurality of connector spring members 32 may be located to form opposing sides to the displacement members 31. The top portion of the spring members 32 may extend above the brush receiving plane 35. The cutting portion 33 of the displacement members 31 may extend below the bottom portion of the spring members 32. The top portion of the spring members 32 and the brush receiving plane 35 may form a brush receiving channel 34. The brush receiving channel 34 may be sized to grip the brush holder apparatus 10. In this manner, the brush receiving channel 34 may be wider at its receiving end and narrower at its distal end. This difference in channel width may allow the brush holder apparatus 10 to be inserted easily into the receiving end of the channel 34, but the spring members 32 may grip and apply contact pressure to the brush holder apparatus 10 at the distal end. This contact pressure may make an electrical connection between the brush holder apparatus 10 and the IDC 30 and secure the brush holder apparatus 10 in the receiving channel 34. The brush receiving channel 34 may run parallel to the IDC longitudinal axis 37. In one embodiment, the connector spring members 32 may have a cantilever-shaped portion 36 at their distal ends to grip the brush holder apparatus 10 and provide an electrical connection.

FIG. 5 shows a partial view of a field 5, which may include a laminated stator 51 and field windings 52 (which may be made up of a plurality of turns of magnet wire, but which are represented as object 52 in FIG. 5). The field 5 may have a terminal board 40 secured to the field 5. The terminal board 40 may be made from electrically insulating materials; a non-limiting example of such a material would be plastic. The terminal board 40 may contain a plurality of terminal blocks 41. In one embodiment, the terminal blocks 41 are molded into the terminal board 40. A terminal block 41 may contain a connector receptacle 42. In one embodiment, the receptacle 42 is molded into the terminal block 41. The connector receptacle 42 may be sized to receive and fixedly retain an IDC 30. The connector receptacle 42 may have a wire receptacle 43 sized to receive and securely retain an electrical wire 50, which may be connected to the field windings 52. The wire 50 may be insulated in one embodiment. The wire receptacle 43 may be molded into the connector receptacle 42. The connector receptacle 42 and the wire receptacle 43 may be located within the terminal block 41 such that they cooperate to align the cutting portions 33 of the IDC 30 with the electrical wire 50.

With reference to FIGS. 2 and 5, one embodiment may include two IDCs 30. In another embodiment, the two IDCs 30 may be positioned on the field 5 opposite each other. In alternative embodiments, as many IDCs 30 as needed may be used. In another embodiment, the IDCs 30 may be positioned at corners of a substantially rectangular field 5. In another embodiment, as many IDCs 30 may be used as there are brush holder apparatuses 10. In another embodiment, the IDCs 30 may be positioned on the field 5 to be aligned with and correspond to the brush receptacles 24 when the field 5 is installed inside the motor housing 20.

In one embodiment, a brush holder apparatus 10 may be fixedly mated with the electric motor housing 20 and obtain electrical connection with the IDC 30 according to the following method. With reference to FIGS. 2 and 5-6, the user may align insulated electrical wire 50 connected to the field windings 52 with the wire receptacle 43 on the terminal block 41 and insert the wire 50 into the receptacle 43. The user may align the IDC 30 with the connector receptacle 42 such that the cutting portion 33 engages the electrical wire 50. The user may forcibly insert the IDC 30 into the connector receptacle 42, thus fixedly attaching the two elements 30, 42. Forcibly inserting the IDC 30 in the receptacle 42 may result in the insulation on the outside of the electrical wire 50 to be removed or pierced by the cutting portion 33, and thus an electrical connection may be made between the wire 50 and the IDC 30. The insertion may also result in the IDC 30 being fixedly mated with the terminal board 40. The user may repeat this procedure for every IDC 30. With the IDCs 30 secured to the field 5, the armature 3 may be inserted inside the field 5, and both 3, 5 may be placed inside the motor housing 20, as previously described, such that the brush receiving channels 34 of the IDCs 30 align with the brush receptacles 24 of the housing 20.

Having assembled the field 5, the armature 3, and the housing 20, the brush holder apparatuses 10 may be installed. As shown in FIGS. 1-3 and 6, the user may next align the longitudinal axis 7 of the brush holder apparatus 10 with longitudinal axis of the brush receptacle 24 (and also with the connector axis 37 and channel 34 of the IDC 30). The user may forcibly insert the brush holder apparatus 10 into the brush receptacle 24 with the open end of the brush holder housing going in first. As the brush holder apparatus 10 moves into the brush receptacle 24, the brush holder apparatus 10 may displace the housing spring member 23 downward or away from the brush holder apparatus 10. In one embodiment, the brush holder apparatus 10 may be inserted in the brush receptacle 24 until the locking element 21 aligns with the receiving aperture 11. In another embodiment, the brush holder apparatus 10 may be inserted in the brush receptacle 24 until the locating element 12 rests against the surface 25 of the locking element 21. The user may align one receiving aperture 11 with one locking element 21 located inside the brush receptacle 24. At this point, the user may release the brush holder apparatus 10, which will allow the spring force of the spring member 23 to move the brush holder apparatus 10 in an upward direction, thus seating the locking element 21 into the receiving aperture 11. The locating element 12 and the locking element 21 may cooperate to prevent the brush holder housing 9 from being inserted too far and jamming the commutator 4. The receiving aperture 11 and the locking element 21 may cooperate to prevent the brush holder housing 9 from being pushed back out of the motor housing 20 by the spring force of the brush 8 against the commutator 4.

In one embodiment, the brush holder apparatus 10 may have receiving apertures 11 and locking elements 12 on both its upper and lower sides, which may be mirror images, thus allowing two possible insertion orientations one hundred and eighty degrees apart. By having two possible insertion orientations, it may become easier for the user to align the brush holder apparatus 10 with the locking element 21 during assembly; the user does not have to pay attention as to the specific orientation of the brush holder apparatus 10 during its insertion into the brush receptacle 24 because either of the two insertions will work.

In another embodiment, the brush holder apparatuses 10 may be installed in the motor housing 20 offset from a common axis 7, as explained previously and shown in FIG. 9. Such offset may allow more surface-area contact between the brush 8 and the commutator 4 for the same size brush 8, which may increase the life of the brush 8. In one embodiment of offset brush holder apparatuses 10, each brush holder apparatus 10 may have only one receiving aperture 11 and locking element 12, which may allow only one insertion orientation and prevent improper assembly.

With reference to FIGS. 3 and 6, as the brush holder apparatus 10 is being inserted into the brush receptacle 24, it 10 may move into the brush receiving channel 34 of the IDC 30. The connector spring members 32 may apply contact pressure to the sides of the brush holder apparatus 10, as shown in FIG. 6. This contact pressure may aid in retaining the brush holder apparatus 10 in the motor housing 20 and may also provide an electrical connection between the brush holder apparatus 10 and the IDC 30. FIG. 6 does not show the motor housing 20 that would enclose the IDC 30 and into which the brush holder apparatus 10 would be inserted. As shown partly in FIG. 3, the brush holder apparatus 10 may be retained by the connector spring members 32 at the side that is urged by the housing spring member 23 and opposite from the side that receives the locking element 21 in the receiving aperture 11.

At this point, all of the components of the motor 2 may be secured such that the brush spring 6 urges the brush 8 to contact the commutator 4 that is located inside the housing 20 and is aligned with the brush holder apparatus 10. Electricity may now be conducted from the field windings 52 through the wire 50 inside the wire receptacle 43, through the IDC 30 that pierces the insulation of and makes electrical contact with the wire 50, through the brush holder housing 9 that is secured inside the IDC channel 34, through the brush 8 that is housed inside the brush holder housing 9, and to the commutator 4 that is contacted by the brush 8. By this method, the brush holder apparatus 10 may be secured inside a motor 2 and may make electrical connection with the field windings 52. In other embodiments, a motor 2 may include the means disclosed here to physically secure the brush holder apparatus 10 inside the motor 2 (by virtue of the design of the brush holder apparatus 10 and the motor housing 20) but use a different means for electrical connection to the brush holder apparatus 10 (and not have the disclosed IDC 30). In other embodiments, a motor 2 may include the means disclosed here for electrical connection to the brush holder apparatus 10 (by the IDC 30) but use a different means to physically secure the brush holder apparatus 10 inside the motor 2 (and not use the disclosed design of the brush holder apparatus 10 and the motor housing 20).

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed.

I claim:
1. A motor assembly comprising:
   a motor housing comprising:
      at least one brush receptacle extending along a longitudinal axis of the brush receptacle and having a top end and a bottom end that are substantially parallel to the longitudinal axis;
      a locking element extending from the top end toward the bottom end of each brush receptacle; and
      a cantilevered housing spring member having a distal end extending substantially along the longitudinal axis and extending from the bottom end toward the top end of each brush receptacle; and
   at least one brush holder apparatus comprising:
      a brush holder housing sized to be received within the at least one brush receptacle, comprising:
         an upper surface and a lower surface that are substantially parallel;
         a first receiving aperture in the upper surface configured to receive the locking element when the brush holder housing is inserted inside the at least one brush receptacle; and an open end that is substantially perpendicular to the upper surface;
a brush spring enclosed by the brush holder housing; and
a brush located inside the brush holder housing but urged out of the open end of the brush holder housing by the brush spring along the longitudinal axis when the brush holder housing is inserted inside the at least one brush receptacle;
wherein the at least one brush holder apparatus is inserted inside the at least one brush receptacle along the longitudinal axis; and
wherein the housing spring member urges the at least one brush holder apparatus toward the top end of the at least one brush receptacle such that the locking element is received inside the first receiving aperture.

2. The motor assembly of claim 1, wherein the brush holder housing further comprises a first locating element by the first receiving aperture and extending from the upper surface away from the lower surface;
wherein the at least one brush receptacle further comprises:
a recessed pocket by the locking element; and
a common surface that is common to the recessed pocket and the locking element;
wherein the recessed pocket is configured to receive the first locating element when the at least one brush holder apparatus is inserted inside the at least one brush receptacle; and
wherein the common surface is configured to contact the first locating element as the at least one brush holder apparatus is inserted inside the at least one brush receptacle and to prevent further insertion of the at least one brush holder apparatus along the longitudinal axis.

3. The motor assembly of claim 2, wherein the brush holder housing further comprises:
a second receiving aperture identical to the first receiving aperture, only in the lower surface; and
a second locating element identical to the first locating element, only by the second receiving aperture and extending from the lower surface away from the upper surface.

4. The motor assembly of claim 3 further comprising:
a field; and
an armature comprising:
a commutator; and
a motor shaft;
wherein the armature is inserted at least partly inside the field;
wherein the field is at least partly enclosed by the motor housing; and
wherein each brush faces and contacts the commutator.

5. The motor assembly of claim 4:
wherein the field further comprises:
a laminated stator;
at least one terminal block secured to the laminated stator and comprising a connector receptacle;
field windings; and
at least one wire electrically connected to the field windings and positioned partly in the connector receptacle;
the motor assembly further comprising at least one conductive connector comprising:
two substantially flat and parallel displacement members, each comprising:
a top portion; and
a distal portion comprising a cutting portion extending from the distal portion toward the top portion and configured to receive the wire; and
two connector spring members, each comprising:
a substantially flat lower portion adjacent to, connected to, and substantially perpendicular to at least one displacement member; and
an upper portion extending above the top portions of the displacement members and cantilevered along substantially a connector axis of the connector;
wherein the cutting portions of the displacement members align along the connector axis, and wherein the displacement members are substantially perpendicular to the connector axis;
wherein the top portions of the displacement members define a brush receiving plane;
wherein the distal portions of the displacement members extend below the lower portions of the connector spring members; and
wherein the upper portions of the connector spring members are angled toward each other at cantilevered ends, defining with the brush receiving plane a brush receiving channel along the connector axis, wherein the brush receiving channel narrows in the direction of the connector axis toward the cantilevered ends, and is configured to receive the brush holder housing;
wherein the at least one connector is inserted into the connector receptacle such that the cutting portions of the displacement members receive and make electrical connection with the at least one wire;
wherein the at least one brush holder apparatus is inserted inside the brush receiving channel of the at least one connector along the connector axis in the direction of narrowing of the brush receiving channel until the at least one brush holder apparatus is held securely by the at least one connector; and
wherein the connector axis is parallel to the longitudinal axis when the at least one brush holder apparatus is inserted inside the brush receiving channel.

6. The motor assembly of claim 5, wherein the connector receptacle further comprises a wire receptacle configured to receive the wire.

7. The motor assembly of claim 6, wherein the field further comprises a non-conductive terminal board from which is molded the at least one terminal block, wherein the terminal board is secured to the laminated stator;
wherein the connector receptacle is molded from each terminal block; and
wherein the wire receptacle is molded from the connector receptacle.

8. The motor assembly of claim 5, wherein the brush holder housing is conductive, and wherein the at least one connector is electrically connected to the brush holder housing when the at least one brush holder apparatus is held securely by the at least one connector.

9. The motor assembly of claim 8, wherein the brush holder housing and the at least one connector are made of a metal selected from the group consisting of brass, copper, aluminum, silver, and gold.

10. The motor assembly of claim 9, wherein the at least one wire further comprises insulation; and
wherein the cutting portions of the displacement members pierce the wire insulation when the at least one connector is inserted into the connector receptacle.

11. The motor assembly of claim 10, wherein each connector is made from one integral, conductive sheet.

12. The motor assembly of claim 11, wherein the at least one brush holder apparatus comprises two brush holder apparatuses that, when inserted in the brush receptacles, have their longitudinal axes substantially aligned along a common longitudinal axis, and are at opposite ends of the motor housing with respect to the common longitudinal axis.

13. The motor assembly of claim 11, wherein the at least one brush holder apparatus comprises two brush holder apparatuses that, when inserted in the brush receptacles, have substantially parallel longitudinal axes that are substantially not aligned along a common longitudinal axis that is perpendicular to a motor axis and parallel to the longitudinal axes of the brush holder apparatuses, and are at opposite ends of the motor housing with respect to the common longitudinal axis.

14. A motor assembly comprising:
  a field comprising:
    a laminated stator;
    at least one terminal block secured to the laminated stator and comprising a connector receptacle;
    field windings; and
    at least one wire electrically connected to the field windings and positioned partly in the connector receptacle;
  at least one conductive connector comprising:
    two substantially flat and parallel displacement members, each comprising:
      a top portion; and
      a distal portion comprising a cutting portion extending from the distal portion toward the top portion and configured to receive the wire; and
    two connector spring members, each comprising:
      a substantially flat lower portion adjacent to, connected to, and substantially perpendicular to at least one displacement member; and
      an upper portion extending above the top portions of the displacement members and cantilevered along substantially a connector axis of the connector;
    wherein the cutting portions of the displacement members align along the connector axis, and wherein the displacement members are substantially perpendicular to the connector axis;
    wherein the top portions of the displacement members define a brush receiving plane;
    wherein the distal portions of the displacement members extend below the lower portions of the connector spring members; and
    wherein the upper portions of the connector spring members are angled toward each other at cantilevered ends, defining with the brush receiving plane a brush receiving channel along the connector axis, wherein the brush receiving channel narrows in the direction of the connector axis toward the cantilevered ends; and
  at least one brush holder apparatus comprising:
    a brush holder housing sized to be received within the brush receiving channel, comprising an open end;
    a brush spring enclosed by the brush holder housing; and
    a brush located inside the brush holder housing but urged out of the open end of the brush holder housing by the brush spring along the connector axis when the brush holder housing is inserted inside the brush receiving channel;
  wherein the at least one connector is inserted into the connector receptacle such that the cutting portions of the displacement members receive and make electrical connection with the at least one wire; and
  wherein the at least one brush holder apparatus is inserted inside the brush receiving channel of the at least one connector along the connector axis in the direction of narrowing of the brush receiving channel until the at least one brush holder apparatus is held securely by the at least one connector.

15. A method comprising the steps of:
  a) providing:
    a motor housing comprising:
      at least one brush receptacle extending along a longitudinal axis of the brush receptacle and having a top end and a bottom end that are substantially parallel to the longitudinal axis;
      a locking element extending from the top end toward the bottom end of each brush receptacle; and
      a cantilevered housing spring member having a distal end extending substantially along the longitudinal axis and extending from the bottom end toward the top end of each brush receptacle; and
    at least one brush holder apparatus comprising:
      a brush holder housing sized to be received within the at least one brush receptacle, comprising:
        an upper surface and a lower surface that are substantially parallel;
        a first receiving aperture in the upper surface configured to receive the locking element when the brush holder housing is inserted inside the at least one brush receptacle; and
        an open end that is substantially perpendicular to the upper surface;
      a brush spring enclosed by the brush holder housing; and
      a brush located inside the brush holder housing but urged out of the open end of the brush holder housing by the brush spring along the longitudinal axis when the brush holder housing is inserted inside the at least one brush receptacle;
  b) inserting the at least one brush holder apparatus, the open end first, into the at least one brush receptacle along the longitudinal axis, causing the housing spring member to move away from the top end of the brush receptacle;
  c) aligning the locking element with the first receiving aperture; and
  d) allowing the housing spring member to urge the brush holder apparatus toward the top end of the brush receptacle and causing the first receiving apparatus to receive the locking element.

16. The method of claim 15:
  wherein the brush holder provided in step a) further comprises a first locating element by the first receiving aperture and extending from the upper surface away from the lower surface;
  wherein the at least one brush receptacle provided in step a) further comprises:
    a recessed pocket by the locking element configured to receive the first locating element when the at least one brush holder apparatus is inserted inside the at least one brush receptacle; and
    a common surface that is common to the recessed pocket and the locking element; and
  wherein step b) further comprises inserting the at least one brush holder apparatus until the first locating element contacts the common surface, preventing further insertion, at which point the locking element is aligned with the first receiving aperture.

17. The method of claim 16:
wherein the brush holder housing provided in step a) further comprises:
  a second receiving aperture identical to the first receiving aperture, only in the lower surface; and
  a second locating element identical to the first locating element, only by the second receiving aperture and extending from the lower surface away from the upper surface; and
wherein the insertion of step b) is possible with either the upper surface or the lower surface of the brush holder housing facing the top end of the at least one brush receptacle.

18. The method of claim 17:
wherein step a) further comprises providing:
  a field; and
  an armature comprising:
    a commutator; and
    a motor shaft;
the method further comprising steps:
  e) inserting the armature at least partly inside the field; and
  f) enclosing at least a part of the field and inserted armature by the motor housing;
wherein steps e) and f) are performed after step a) and before step b); and
wherein after the at least one brush holder apparatus is inserted in step b), the brush faces and contacts the commutator.

19. The method of claim 18:
wherein the field provided in step a) further comprises:
  a laminated stator;
  at least one terminal block secured to the laminated stator and comprising a connector receptacle;
  field windings; and
  at least one wire electrically connected to the field windings;
wherein step a) further comprises providing at least one conductive connector comprising:
  two substantially flat and parallel displacement members, each comprising:
    a top portion; and
    a distal portion comprising a cutting portion extending from the distal portion toward the top portion and configured to receive the wire; and
  two connector spring members, each comprising:
    a substantially flat lower portion adjacent to, connected to, and substantially perpendicular to at least one displacement member; and
    an upper portion extending above the top portions of the displacement members and cantilevered along substantially a connector axis of the connector;
  wherein the cutting portions of the displacement members align along the connector axis, and wherein the displacement members are substantially perpendicular to the connector axis;
  wherein the top portions of the displacement members define a brush receiving plane;
  wherein the distal portions of the displacement members extend below the lower portions of the connector spring members; and
  wherein the upper portions of the connector spring members are angled toward each other at cantilevered ends, defining with the brush receiving plane a brush receiving channel along the connector axis, wherein the brush receiving channel narrows in the direction of the connector axis toward the cantilevered ends, and is configured to receive the brush holder housing;
the method further comprising steps:
  g) positioning part of the wire in the connector receptacle; and
  h) inserting the at least one connector into the connector receptacle such that the cutting portions of the displacement members receive and make electrical connection with the at least one wire;
wherein steps g) and h) are performed after step a) and before step e); and
wherein step b) further comprises inserting the at least one brush holder apparatus inside the brush receiving channel of the at least one connector along the connector axis in the direction of narrowing of the brush receiving channel until the at least one brush holder apparatus is held securely by the at least one connector, wherein the connector axis is parallel to the longitudinal axis when the at least one brush holder apparatus is inserted inside the brush receiving channel.

20. The method of claim 19:
wherein the connector receptacle provided in step a) further comprises a wire receptacle configured to receive the wire;
wherein the brush holder housing provided in step a) is conductive;
wherein the brush holder housing and the at least one connector provided in step a) are made of a metal selected from the group consisting of brass, copper, aluminum, silver, and gold;
wherein the at least one wire provided in step a) further comprises insulation;
wherein step b) further comprises electrically connecting the at least one connector to the brush holder housing when the at least one brush holder apparatus is held securely by the at least one connector;
wherein step g) further comprises positioning part of the wire in the wire receptacle; and
wherein step h) further comprises piercing the wire insulation with the cutting portions of the displacement members.

* * * * *